(12) United States Patent
Borg (10) Patent No.: US 8,125,685 B1
(45) Date of Patent: Feb. 28, 2012

(54) CLIPPING COLORS TO A GAMUT SURFACE

(75) Inventor: Lars U. Borg, Saratoga, CA (US)

(73) Assignee: Adobe Systems Incorporated, San Jose, CA (US)

(*) Notice: Subject to any disclaimer, the term of this patent is extended or adjusted under 35 U.S.C. 154(b) by 659 days.

(21) Appl. No.: 12/242,677

(22) Filed: Sep. 30, 2008

(51) Int. Cl.
*H04N 1/60* (2006.01)

(52) U.S. Cl. ......... 358/1.9; 358/518; 358/521; 382/162; 382/167

(58) Field of Classification Search .................. None
See application file for complete search history.

(56) References Cited

U.S. PATENT DOCUMENTS

| | | | | |
|---|---|---|---|---|
| 6,204,939 B1* | 3/2001 | Lin et al. | ........................ | 358/518 |
| 6,313,840 B1* | 11/2001 | Bilodeau et al. | .............. | 345/423 |
| 6,421,142 B1* | 7/2002 | Lin et al. | ........................ | 358/1.9 |
| 6,724,507 B1* | 4/2004 | Ikegami et al. | ................ | 358/518 |
| 7,167,277 B2* | 1/2007 | Shimizu et al. | ................ | 358/1.9 |
| 7,583,411 B2* | 9/2009 | Kang et al. | ...................... | 358/2.1 |
| 7,623,266 B2* | 11/2009 | Sloan | .............................. | 358/1.9 |
| 7,663,641 B2* | 2/2010 | Sloan | ............................ | 345/590 |
| 7,702,146 B2* | 4/2010 | Tin | ................................ | 382/162 |
| 2004/0061881 A1* | 4/2004 | Shimizu et al. | ................ | 358/1.9 |
| 2005/0024652 A1* | 2/2005 | Gondek | ......................... | 358/1.9 |
| 2006/0176528 A1* | 8/2006 | Dalrymple et al. | ........... | 358/518 |
| 2007/0070363 A1* | 3/2007 | Zeng | ............................... | 358/1.9 |
| 2007/0086028 A1* | 4/2007 | Cho et al. | ........................ | 358/1.9 |
| 2007/0097389 A1* | 5/2007 | Morovic | ......................... | 358/1.9 |
| 2008/0080767 A1* | 4/2008 | Cho et al. | ....................... | 382/167 |

* cited by examiner

*Primary Examiner* — King Poon
*Assistant Examiner* — Dung Tran
(74) *Attorney, Agent, or Firm* — Fish & Richardson P.C.

(57) ABSTRACT

A method includes defining a bounded space approximating a color gamut based on a plane approximately tangential to the color gamut. The method further includes identifying an input point and determining a first distance between the plane and the input point. The first distance is measured in a direction normal to the plane. The method also includes determining a second distance between the input point and an aim point. The second distance is measured in a direction normal to the first plane. The method further includes determining a clipped point based on a ratio between the first distance and the second distance, the clipped point representing an approximation of a color on a boundary of the color gamut.

23 Claims, 8 Drawing Sheets

CLIPPING COLORS TO A GAMUT SURFACE

BACKGROUND

The present disclosure relates to color conversion techniques and color management systems and software.

Devices that are capable of representing image data (e.g., monitors, printers, scanners, cameras) often have significant variations in color gamut, the range of colors producible by the device. Some colors can be displayed in some color gamuts but not others. To accommodate this range in device gamuts, a variety of color spaces, and color management systems and techniques have been developed. Color management enables different color space values to be mapped from one device's gamut to another's using color profiles, which define how color information is transformed into or out of a standard reference space called a profile connection space.

Using color management, a human's perception of color from one device representation to another can be kept close to constant, despite the variation in color capabilities of different devices. To assist in color management, the Commission Internationale de L'Eclairage (CIE) has defined various color spaces that are device independent and encompass the full gamut of human vision, and can thus be used as profile connection spaces. Typical profile connection spaces in color management systems include CIE XYZ and CIE LAB. CIE LAB space is a color space having a luminance channel, L*, and opponent color channels, a*(green→red) and b*(blue→yellow).

A color profile defines how to transform color information from one color space to another, such as from a device-dependent color space into a profile connection space, or the reverse. Many color profiles also conform to a defined color profile architecture, which provides flexibility in their use. For example, the International Color Consortium (ICC) provides a defined color profile architecture commonly used in many color management systems. ICC profiles have been developed for many different color spaces.

SUMMARY

This specification describes technologies relating to clipping colors to a gamut surface.

In general, one aspect of the subject matter described in this specification can be embodied in a method that includes defining a bounded space approximating a color gamut based on a plane approximately tangential to the color gamut. The method further includes identifying an input point and determining a first distance between the plane and the input point. The first distance is measured in a direction normal to the plane. The method also includes determining a second distance between the input point and an aim point. The second distance is measured in a direction normal to the first plane. The method further includes determining a clipped point based on a ratio between the first distance and the second distance, the clipped point representing an approximation of a color on a boundary of the color gamut.

These and other embodiments can optionally include one or more of the following features. The bounded space can be defined in a Cartesian coordinate system that has more than two dimensions. The color gamut can be associated with a device-dependent color space, and the bounded space can be defined in a device-independent color space. The first plane can be defined by a point on the first plane and a normal vector to the first plane and determining the second distance can include determining a scalar projection of a vector having endpoints of the input point and the aim point onto the normal vector defining the first plane. The first distance can be determined based on a dot product of the normal vector and a vector comprising the input point and an origin point.

The color gamut can be a first color gamut, and the input point can be derived from a color value of a device-dependent color space that differs from a color space associated with the first color gamut. The bounded space can include a second plane approximately tangential to the color gamut, the input point can be outside the bounded space with respect to the first plane and the second plane, and the embodiments can further include: determining, in a direction normal to the second plane, a third distance between the second plane and the input point; determining, in a direction normal to the second plane, a fourth distance between the input point and an aim point located within the bounded space; determining a maximum relative distance based on a comparison of a ratio of the first and second distance with a ratio of the third and fourth distance; and determining a clipped point representing at least an approximation of a color on a boundary of the color gamut based on the maximum relative distance.

The input point can represent a color that is outside the bounded space, the aim point can represent a color within the bounded space, and the second distance can include a combination of the first distance and a distance between the first plane and the aim point in a direction normal to the first plane. The embodiments can further include determining whether the input point is inside or outside the bounded space using the first distance; and using the clipped point as an output point, when the input point is determined to be outside the bounded space.

Particular embodiments of the subject matter described in this specification can be implemented to realize one or more of the following advantages. Gamut mapping can be performed in a Cartesian coordinate space, which can reduce the complexity of computer code implementing gamut mapping. Gamut mapping can be accomplished without first selecting a subset of gamut segments.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Device-independent color spaces, sometimes referred to as connection spaces, such as CIE LAB and CIE XYZ, allow expression of virtually all visible colors. They are often used as intermediaries and sometimes as source color spaces in the conversion process between, to, and from device-dependent color spaces such as sRGB (standard Red, Green, Blue), SWOP CMYK (Specifications for Web Offset Publications Cyan, Magenta, Yellow, Key), or DPX (Digital Picture Exchange). Often when converting colors from a device-independent color space to a device-dependent color space, such as converting from CIE LAB to a particular printer's CMYK color space, some colors fall outside of the gamut of the device-dependent color space and require mapping to colors within the gamut of the destination device's color space so that the color can be displayed or printed using the destination device. When viewed graphically in the independent color space, such as a color space defined in a Cartesian coordinate system like CIE LAB, the point representing the source color value appears outside the region of the graph representing the gamut. Before converting to the destination color space from the independent color space, the source color value can be mapped or clipped to a color value on the surface of the gamut.

To accomplish the clipping or mapping, the gamut can be approximated using multiple intersecting planes that are tangential or roughly tangential to the gamut. An aim point within the gamut can be used to determine a line segment from the aim point to the point representing the source color value. The point at which the line segment and the plane representing the gamut's surface intersect can be the clipped color value on the gamut's surface. The clipped color value can be converted from the independent color space to the dependent color space.

Figure 1:
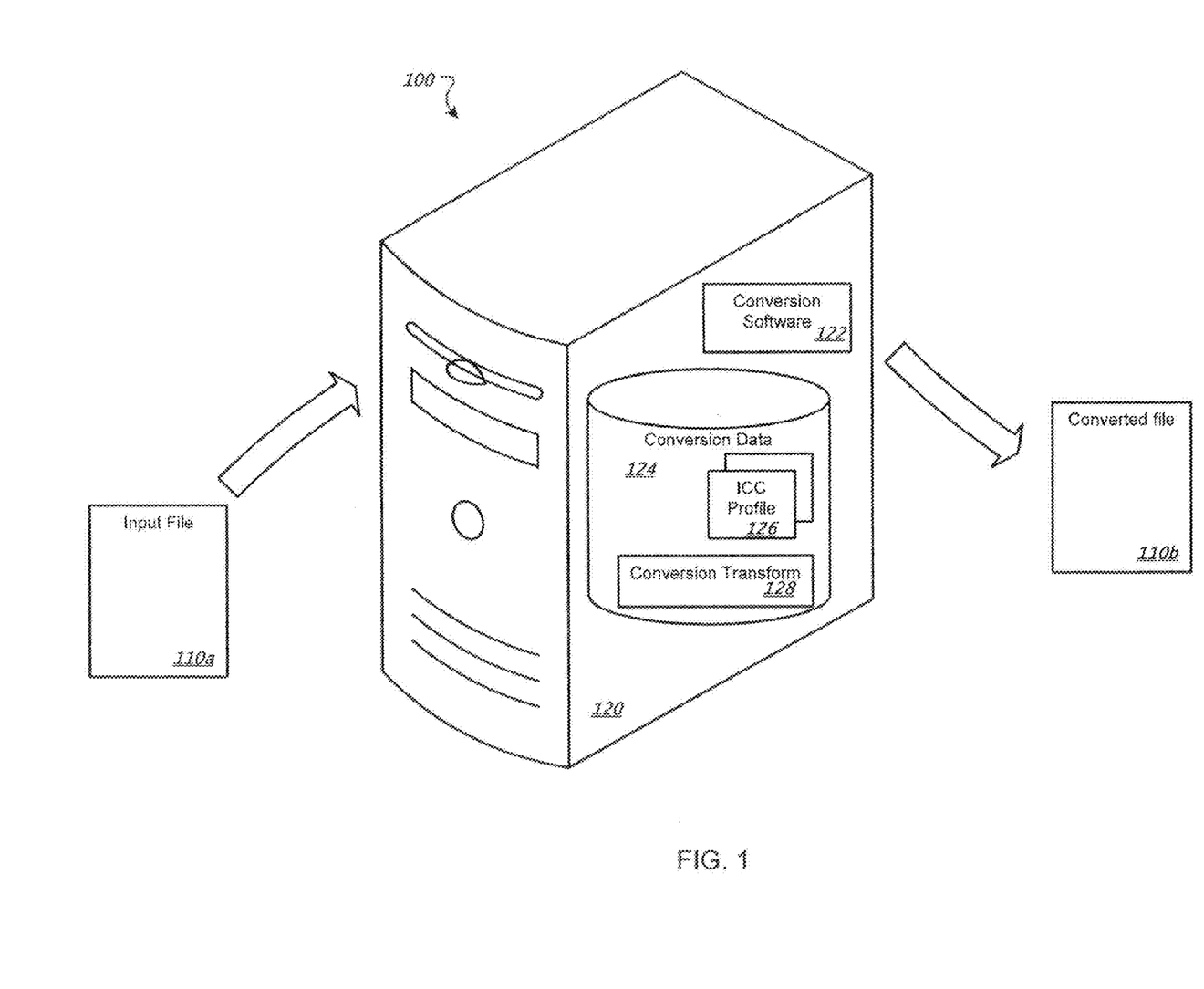
FIG. 1 is a block diagram of a color conversion system.

As shown in FIG. 1, a color conversion system 100 includes a processing machine 120 that receives an input file 110a having colors expressed in a source color space and transmits a converted file 110b having colors expressed in a destination color space. The processing machine 120 includes conversion software 122 and conversion data 124. Generally, the conversion software 122 determines for each color value in the input file 110a a corresponding color value in a destination color space using a direct mapping or conversion or an indirect conversion through an intermediate color space, such as a device-independent color space. Relationship for converting between the color spaces can be defined in color profiles 126, which can be ICC or other types of color profiles. The conversion software 122 may use the color profile 126 and other logic and information to clip input color values in the input file 110a that are outside the destination color gamut to color values within the destination color gamut. The conversion software 122 may include other functionality such as color conversion to and from a device-independent color space, and applying conversion methods and techniques.

The input file 110a and converted file 110b (collectively, files 110) each may be any collection of electronic data that includes color data defined in one or more color spaces. The input file 110a generally includes color data in an input color space and the converted file 110b generally includes color data in a destination color space. The files 110 may also include other data, such as text, embedded fonts, images and 2D vector graphics data (data in addition to related color data), digital rights management information, and other types of non-color data. The files 110 may adhere to a given specification or format, including, for example, the Moving Picture Experts Group 3 video file format (MPEG-3), Extensible Markup Language Paper Specification (XPS), portable document format (PDF), Joint Photographic Experts Group (JPEG), Tagged Image File Format (TIFF), and Portable Network Graphics (PNG) file formats. The input and destination color spaces may be based on any of a variety of color models, such as RGB, CMYK, YCrCb, CIE LAB, CIE LCH, and many others. The input color values may be converted to color values in another color space, such as a color space with fewer color components, before being converted to the destination color space. For example, the input file may have color values initially in a CMYK color space that are converted to a CIE LAB color space before ultimately being converted to a destination CMYK color space by conversion software 122. The input file 110a may also include a color profile, such as an ICC profile, that defines the color space or color spaces used within the file.

The processing machine 120 is any apparatus, device, or combination of machines for processing data, including, for example, a programmable processor, a computer, or multiple processors or computers. The processing machine 120 can include, in addition to hardware, code that creates an execution environment for the computer program in question, e.g., code that constitutes processor firmware, a protocol stack, a database management system, an operating system, or a combination of one or more of them. The processing machine 120 includes color conversion software 122 and conversion data 124.

Generally, the color conversion software 122 may be a computer program that is executed by the processing machine 120 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one processing machine 120 or on multiple processing machines 120 that are located at one site or distributed across multiple sites and interconnected by a communication network.

The conversion data 124 facilitates the transformation of color data from the input/source color space to destination color space of the converted file 110b. The conversion data 124 may be described in a table, a matrix, a formula, a flat file, a lookup table, a computer program, or any combination of these. The conversion data 124 may describe or embody any type of processing that is usually associated with color conversion. The processing may be a single step or a series of steps that may utilize any combination of formulas, matrices, or lookup tables. The conversion data 124 may include one or more color profiles 126. Generally, a color profile 126, associated with a particular color space, is a file that contains information for converting color values from the particular color space to another, usually device-independent, color space and vice-versa. Color profiles can also be stored in the input and output files 110.

In operation, the processing machine 120 receives input file 110a and executes the color conversion software 122. The input file 110a may be received from memory, a storage device, or input from a network or an input device. The color data in input file 110a can be defined in virtually any color space and can include color data that is outside the gamut of the destination color space. Each of the color values in the input file 110a can be converted to a color value in the destination color space and output in converted file 110b using conversion software 122, which in turn uses the conversion data 124.

The conversion data 124 can include data related to converting between the source and destination color spaces, such as data related to gamut mapping. For example, the conversion data 124 can include data related to determining an aim point within the gamut or defining the planes that approximate the gamut. The conversion data 124 can be used by the conversion software 122 to clip and/or convert the color values in the input file 110a. The conversion software 122 can identify the input color values in or derived input color values from the input file 110a and can convert the color values to a device-independent color space, if the color values are not already in a device-independent color space. An example color gamut and its representative bounded space 202 is shown in FIG. 2A.

Figure 2A:
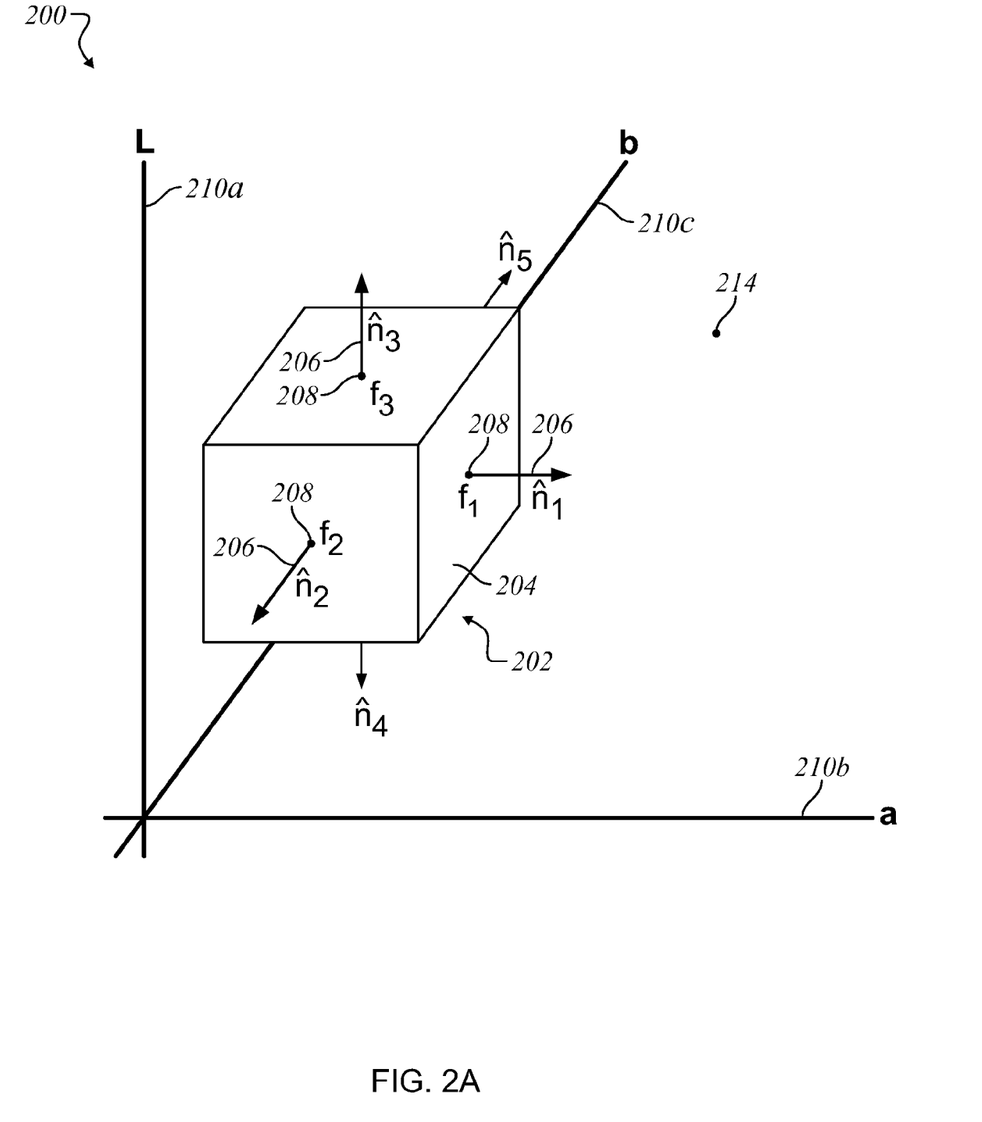
FIG. 2A is a graph of a bounded space.

FIG. 2A is a graph 200 of a bounded space 202 representing a color gamut of a destination color space. The bounded space 202 includes multiple boundaries 204, which can be described as planes. In the example shown in FIG. 2, the bounded space 202 representing the color gamut is defined by six boundaries 204 or planes. Each boundary 204 represents the outer limits of the color gamut or bounded space and can be defined by a normal vector 206 that is orthogonal to the plane or boundary and an offset 208 representing an offset from the origin of the coordinate system 200. Each normal vector 206 can define a direction that its corresponding plane faces. The normal vector 206 can be defined to face away from the bounded area 202, as shown in FIG. 2A, or towards the bounded area (not shown). Each offset 208 can be used to place the plane in the coordinate system 200. A point on the plane can be used instead of the offset to place the plane in the coordinate system. The coordinate system 200 can be a Cartesian coordinate system containing axes 210. In this example, the coordinate system 200 defines a CIE LAB color space, where the axes represent color components (L*, a*, and b*) of the CIE LAB color space. An input point 214 representing an input color value that is outside the color gamut of the destination color space is shown outside of the bounded space 202.

Figure 2B:
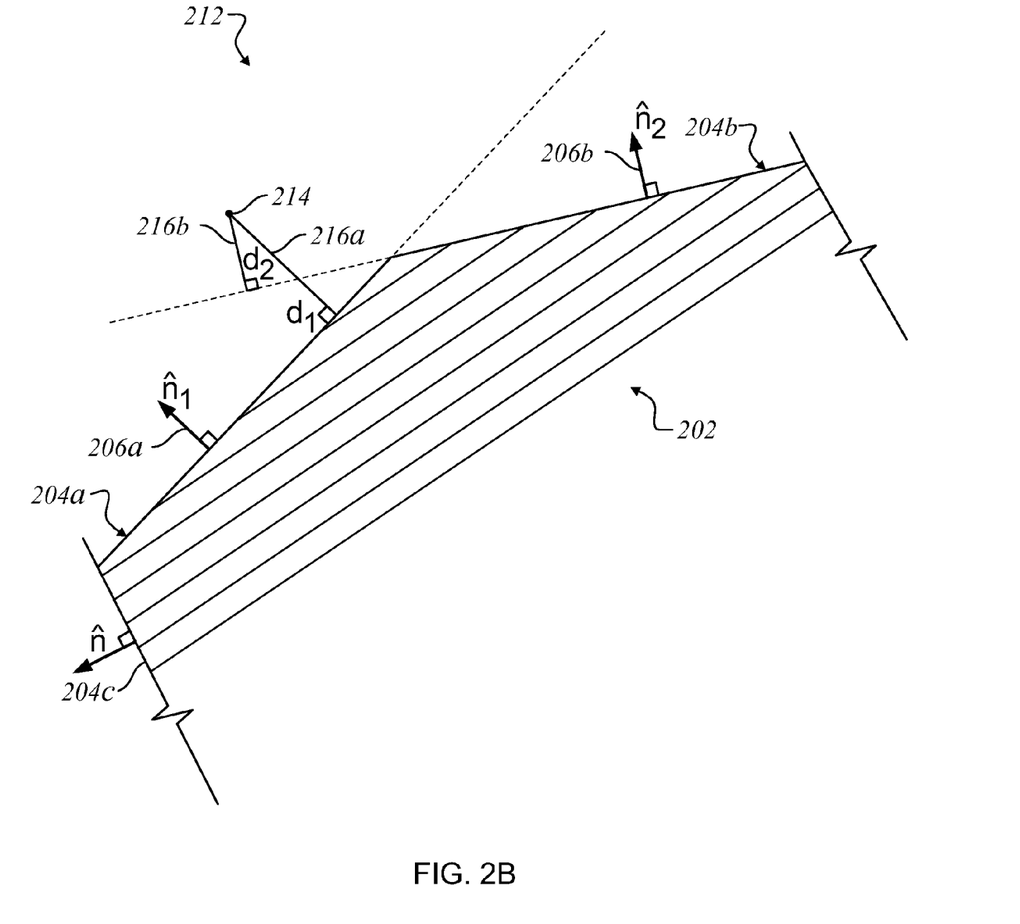
FIG. 2B is a diagram of an input point outside a bounded space with respect to multiple boundaries.

FIG. 2B is a diagram 212 of an input point 214 outside a bounded space 202 with respect to multiple boundaries 204. The boundary 204 that is furthest from the input point 214 can be used to clip the input point 214 to a point that is on the surface of the bounded space 202, which is within the color gamut of the destination space. The distance from each plane 204 to the input point 214 can be determined by calculating the distance from the input point 214 to the boundary 204 along the path that is orthogonal to the plane of the boundary 204, which is also the distance in the direction of the normal vector 206 that partially defines the plane. This distance can have a sign. The scalar projection of the vector from the input point 214 to the boundary 204 onto the normal vector 206 can be used as the distance. In the example there are two distances, the first being the distance 216a to the first plane 204a and the second being the distance 216b to the second plane 204b. Each distance 216 can be determined by taking the dot product of the normal vector with the vector of the input point 214 (as defined from the origin to the input point) and subtracting that point from the offset. The following equation can be used to calculate the distance from the input point 214 to the boundary 204, where $d_i$ is distance, n is the normal vector of the boundary 204, i is the vector of the input point from the origin, and f is the offset of the boundary 204 from the origin:

$$d_i = n \cdot i - f \qquad \text{Eq. 1}$$

When the normal vectors are defined to point away from the bounded space, the distances using this equation are positive if the input point 214 is outside the bounded space 202 with respect to the boundary 204, i.e., if the input point 214 is on the out-of-gamut side of the boundary 204. The distance can be calculated for each of the boundaries 204 of the bounded space 202. From the sign of the distance, we can determine if the point is inside or outside the boundary. If the distance is zero or negative, the input point is inside this boundary, and no further processing is needed to move it from the outside of the boundary. As shown in FIG. 2B, there may be multiple boundaries 204 (specifically, 204a and 204b) for which the distances are positive and with respect to which the input point 214 falls outside the bounded space 202. The input point 214 can be "within" the bounded space 202 with respect to some boundaries 204, such as boundary 204c. In other words, some boundaries 204 do not exclude the input point 214 from the bounded space 202. For boundaries 204 with respect to which the input point 214 falls outside the bounded space 202, the boundary that is relatively the furthest from the input point with respect to an aim point 218, as shown in FIG. 2C, can be determined by finding the maximum relative distance from the input point 214 to the boundaries 204 with respect to the aim point 218.

Figure 2C:
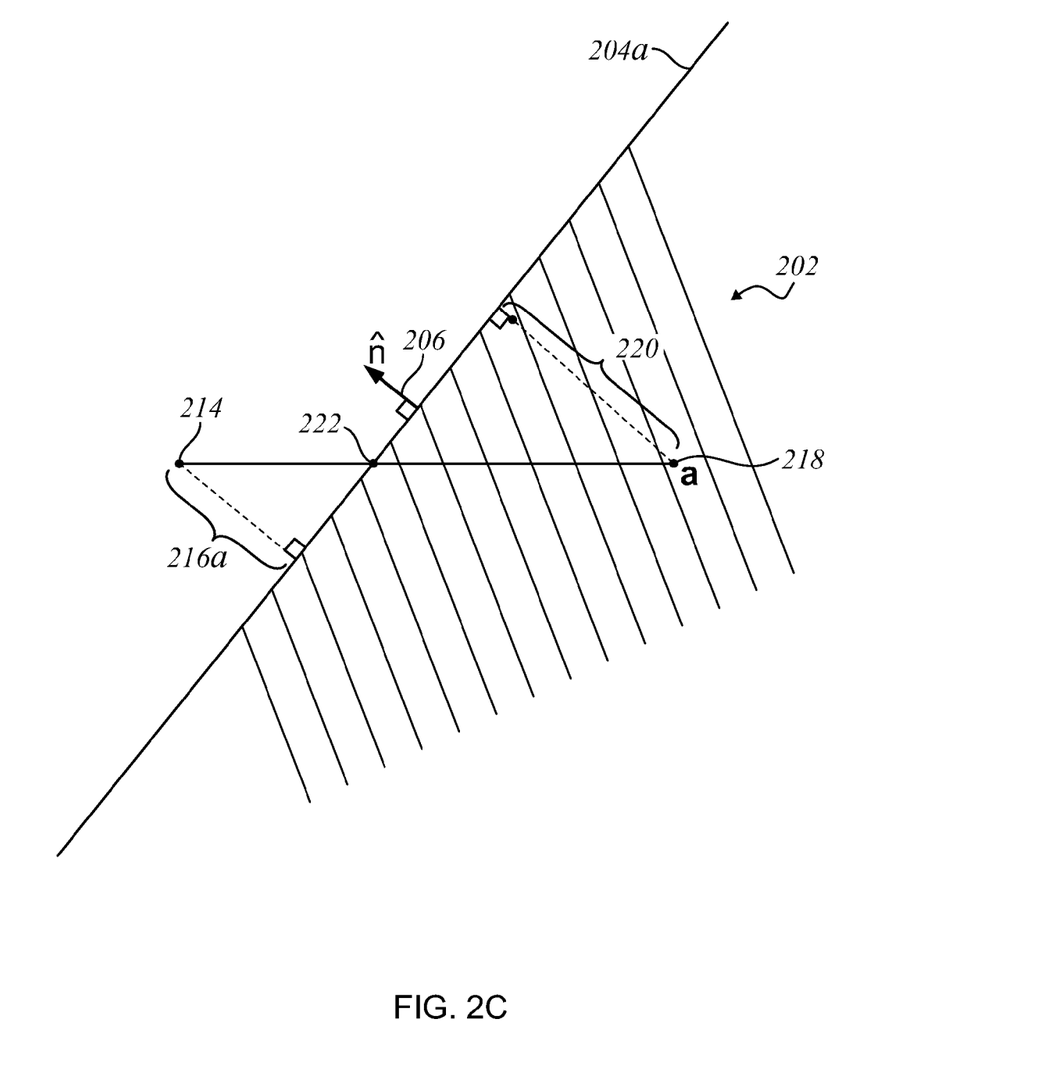
FIG. 2C is a diagram of an input point outside a bounded space and an aim point inside the bounded space.

FIG. 2C illustrates an input point 214 that is outside a bounded space 202 with respect to a boundary 204a and an aim point 218 that is inside the bounded space 202. The relative distance of the input point 214 to the boundary 204 with respect to the aim point 218 can be determined using the following equation, where r is the relative distance, d is the normal distance from the input point 214 to the boundary 204 as given by the previous equation, and z is the projection of the distance from the input point 214 to the aim point 218 onto the normal vector 206:

$$r = d_i/z \qquad \text{Eq. 2}$$

The projection z can be determined by the following equation, where n is the normal vector, i is the vector from the origin to the input point 214, and a is the vector from the origin to the aim point 218:

$$z = n \cdot (i - a) \qquad \text{Eq. 3}$$

The projection can also be determined by subtracting from the normal distance 216 (from the input point 214 to the boundary 204) the normal distance 220, which is from the aim point 218 to the boundary 204 in the direction of the normal vector 206. The following equation can be used where the z is the scalar projection of the vector from the aim point 218 to the input point 214, $d_a$ is the distance normal distance 220, and $d_i$ is the normal distance 216:

$$z = d_i - d_a \qquad \text{Eq. 4}$$

Because the aim point 218 is within the bounded space 202, the value can be negative when the normal vector 206 points away from the bounded space 202. In other words, the normal distance 216 and the normal distance 220 will have disparate signs when the aim point 218 and the input point 214 are on opposite sides of the boundary. The normal distance 220 from the aim point 218 to the boundary 204 can be given by the following equation, where $d_a$ is distance, n is the normal vector 206 of the boundary 204, a is the vector of the aim point 218 from the origin, and f is the offset of the boundary 204 from the origin:

$$d_a = n \cdot a - f \qquad \text{Eq. 5}$$

The relative distance, r, can be calculated using a combination of Eqs. 2-5 for each of the boundaries 204 with respect to which the input point 214 is excluded from the bounded space 202. The maximum relative distance, r, can be associated with the boundary 204 from which to determine the clipped point on the surface of the gamut. The actual clipped point can be calculated using the following equation, where o is the clipped point 222, i is the input point 214, r is the maximum relative distance, and a is the aim point 218:

$$o = i + r(a - i) \qquad \text{Eq. 6}$$

Turning back to FIG. 1, the conversion software 122 can be used to implement the aforementioned equations to determine the clipped point 222 and to further convert the clipped point 222 from a device-independent color space to a destination color space using a color profile 126 associated with the destination color space. The converted clipped point 222 can be output in converted file 110b along with other color values that may or may not have been clipped, but were converted from the source color space to the destination color space. Although FIGS. 2B and 2C are two-dimensional illustrations, analogous principles apply to dimensions greater than two. Similar principles apply where the normal vectors 206 associated with the boundaries 204 are defined to point into the bounded space 202, with the distances having opposite signs.

Figure 2D:
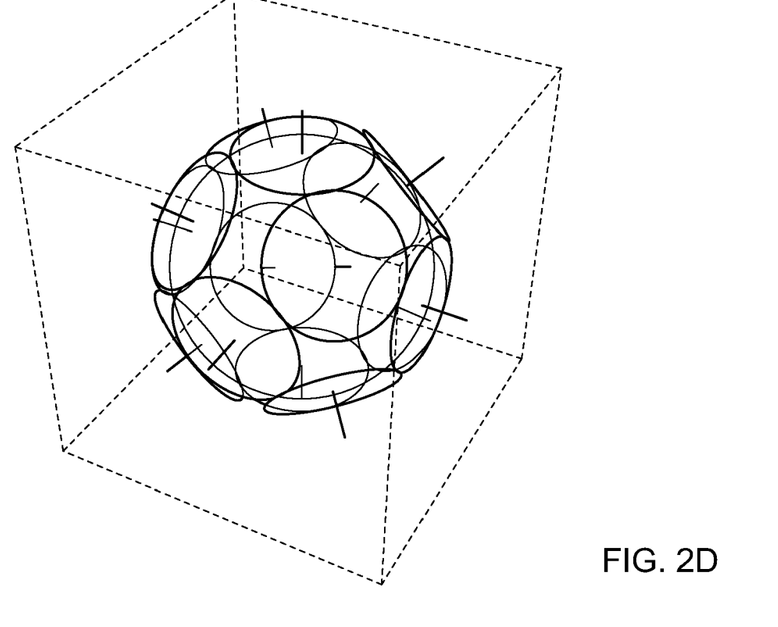
FIG. 2D is an example of boundary planes and their normal vectors.
Figure 2E:
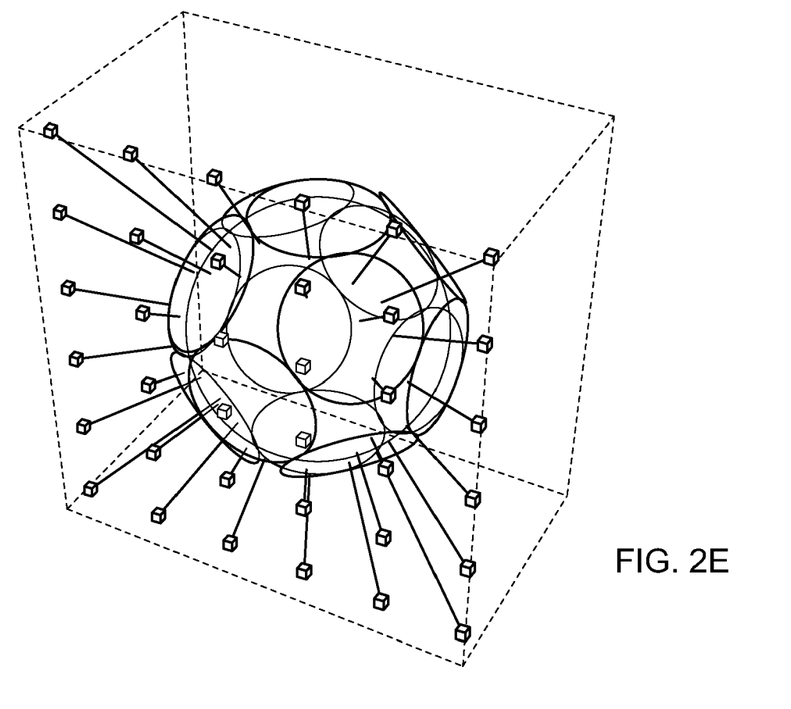
FIG. 2E is a sample of input points and their projections onto the boundary planes.

FIG. 2D is an example of boundary planes and their normal vectors. The planes, as depicted, are tangential to the surface of the gamut. The number of boundaries can be increased to create a closer approximation of the gamut surface. The normal vectors are depicted as pointed away from the bounded space, but could be defined as pointing toward the bounded space. FIG. 2E is a sample of input points and their projections onto the boundary planes. The input points, shown as cubes, can be clipped to the boundaries of the gamut.

Figure 3A:
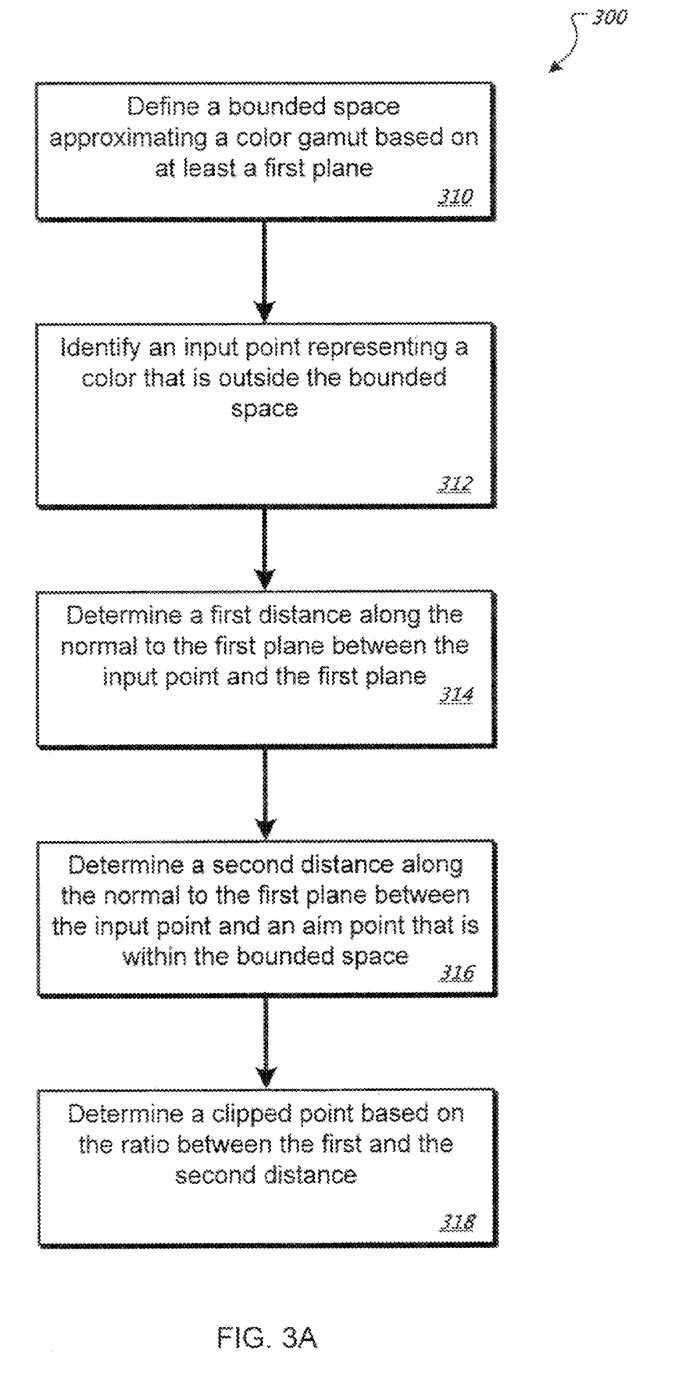
FIG. 3A is a flow chart illustrating a process for clipping out of gamut color values to the gamut surface.

FIG. 3A is a flow chart illustrating a process 300 for clipping out of gamut color values to the gamut surface. Generally, process 300 involves determining where a line connecting an input point and an aim point intersects the color gamut. At 310, a bounded space approximating a color gamut is defined. The bounded space can be defined in a color space that includes a Cartesian coordinate system, such as CIE LAB and CIE XYZ. The bounded space can include a plane, polygon, and/or surface that partially defines or forms the bounded space. The plane, polygon, and/or surface can be associated with an offset and/or a normal vector that points away from or toward the bounded space.

At 312, an input point representing a color that may be outside the bounded space can be identified. At 314, a first distance along the normal to the plane forming a boundary of the bounded space can be determined between the input point and the plane. The distance can be calculated using a mathematical formula similar to Eq. 1. At 316, a second distance along the normal to the plane can be determined between the input point and an aim point that is within the bounded space. The distance can be a projection of the vector ending with the input point and the aim point onto the normal vector and can be calculated using formulas similar to Eq. 3 or Eq. 4. At 318, a clipped point can be determined based on the ratio between the first and the second distance. For example, a mathematical formula similar to Eq. 6 can be used.

Figure 3B:
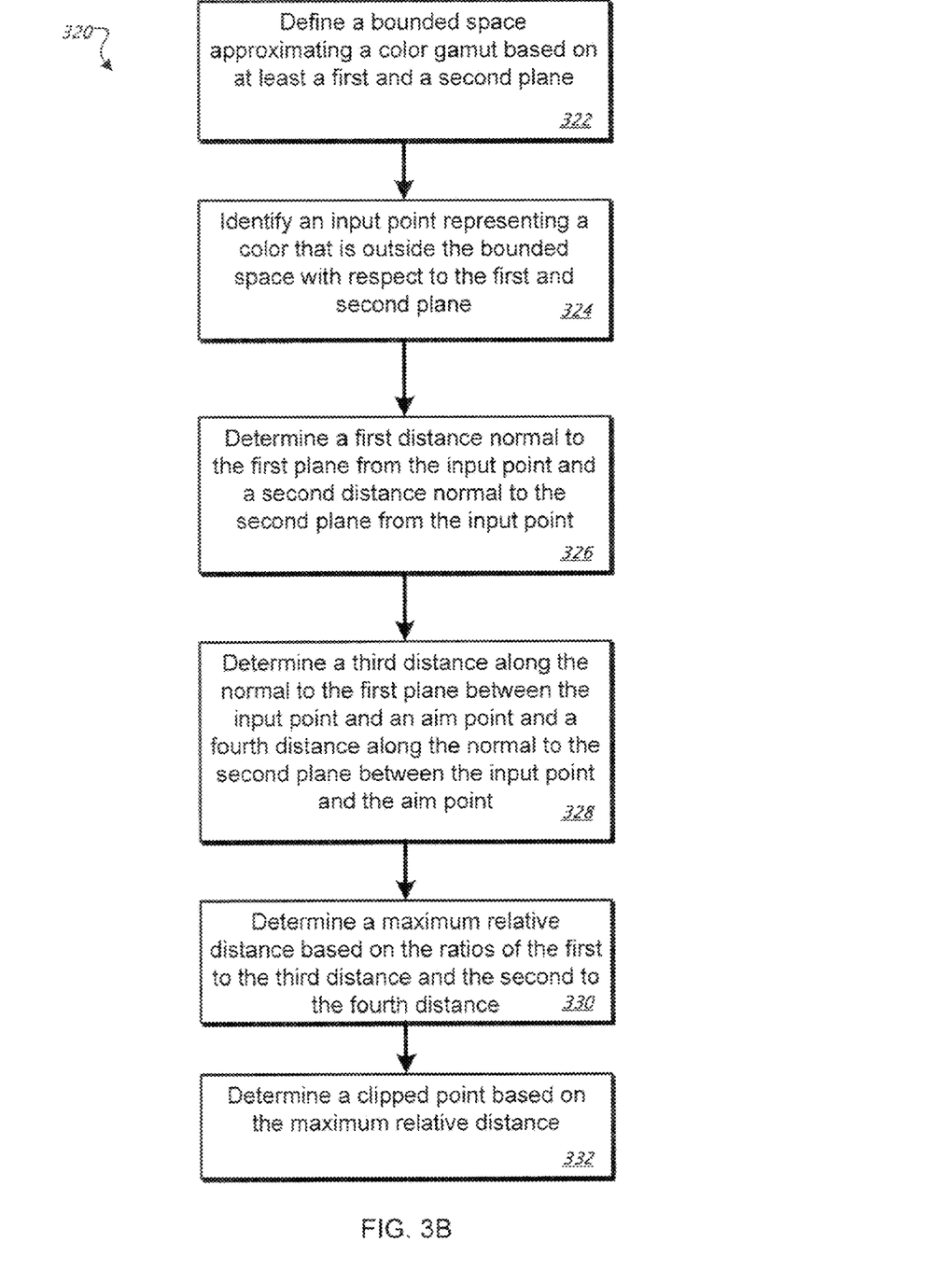
FIG. 3B is a flow chart illustrating a process for clipping out of gamut color values to the gamut surface where the input point is beyond the gamut with respect to multiple planes.

FIG. 3B is a flow chart illustrating a process 320 for clipping out of gamut color values to the gamut surface where the input point is beyond the gamut with respect to multiple planes, polygons, and/or surfaces of the boundary space. At 322, a bounded space approximating a color gamut is defined. The bounded space can be defined in a color space that includes a Cartesian coordinate system, such as CIE LAB and CIE XYZ. The bounded space can include multiple planes, polygons, and/or surfaces that connect together to form or define the bounded space. Each plane, polygon, and/or surface can be associated with an offset and/or a normal vector that points away from or toward the bounded space.

At 324, an input point representing a color that may be outside the bounded space with respect to a first and second plane, polygon, and/or surface can be identified. At 326, a first distance along the normal to the first plane of the bounded space can be determined between the input point and the first plane. Similarly, a second distance along the normal to the second plane of the bounded space can be determined between the input point and the second plane. The first and second distances can be calculated using a mathematical formula similar to Eq. 1. At 328, a third distance along the normal to the first plane can be determined between the input point and an aim point that is within the bounded space. A fourth distance along the normal to the second plane can be determined between the input point and an aim point that is within the bounded space. The third and fourth distances can be projections of the vector ending with the input point and the aim point onto the normal vectors for the first and second plane, respectively, and can be calculated using formulas similar to Eq. 3 or Eq. 4. At 330, a maximum relative distance can be determined as the greater of the ratio of the first to the third distance and the ratio of the second to the fourth distance. At 332, a clipped point can be determined based on the maximum relative distance. A mathematical formula similar to Eq. 6 can be used to determine the clipped point.

Figure 4:
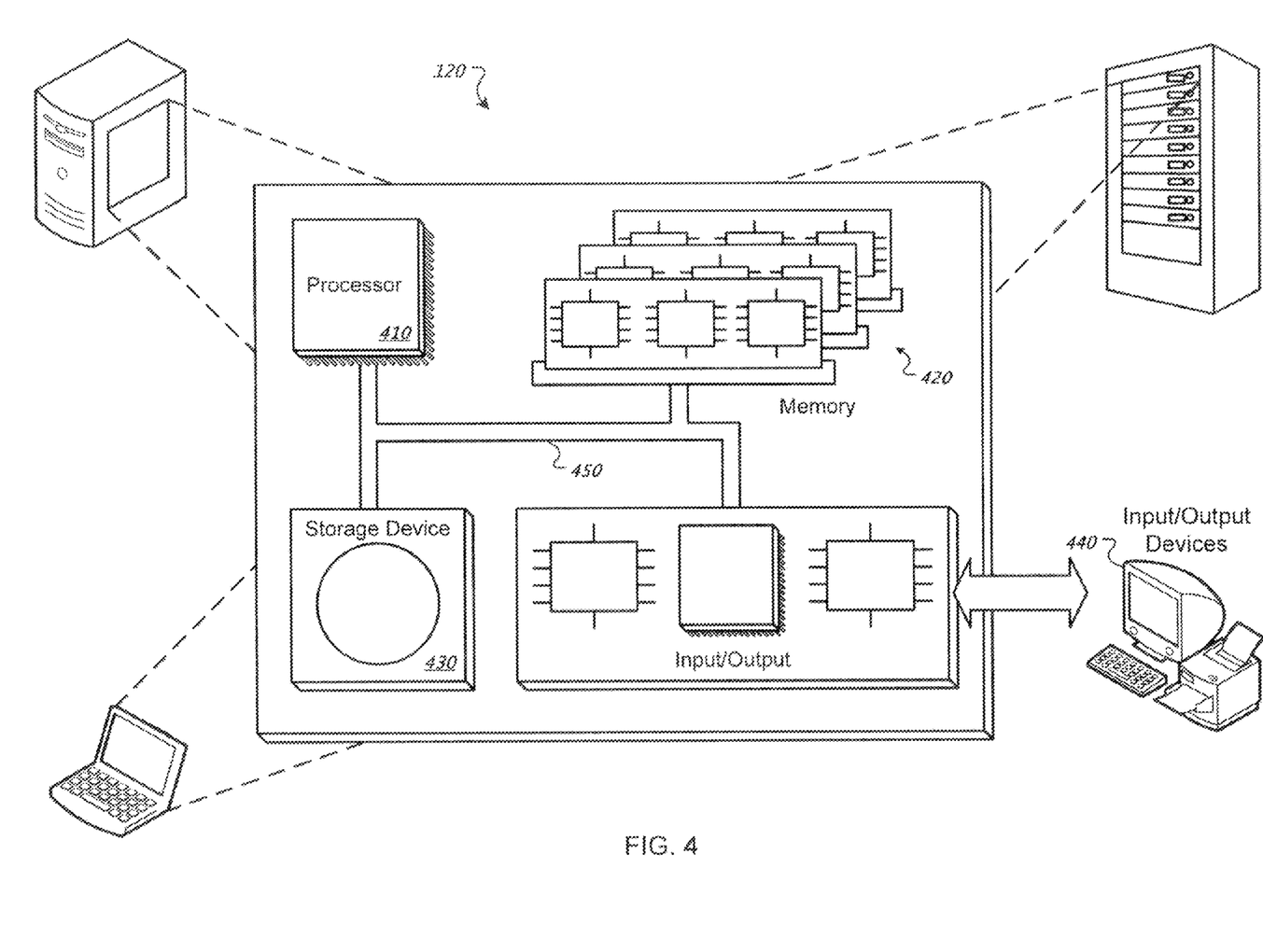
FIG. 4 illustrates an example processing machine.

FIG. 4 illustrates an example processing machine 120. In general, the processing machine 120 includes a processor 410, memory 420, storage device 430, input/output devices 440, and communications bus 450, which allows the other devices to communicate with one another. Input and output devices 440 include any device that may interact with a processing machine 120, such as printers, monitors, keyboards, trackballs, mice, networks, etc.

A processor 410 may be suitable for the execution of a computer program, and includes, by way of example, both general and special purpose microprocessors, and any one or more processors of any kind of digital computer. Moreover, the processor 410 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 420.

The memory 420 and storage device 430 are computer readable media suitable for storing computer program instructions and data. The memory 420 may be any form of volatile or non-volatile memory, media and memory devices, including by way of example semiconductor memory devices, e.g., DRAM, SRAM, EPROM, EEPROM, and flash memory devices. The storage device 430 may be any form of non-volatile memory, such as magnetic disk drives, e.g., internal hard disks or removable disks; magneto optical disk drives; and CD ROM and DVD-ROM disk drives. The processor 410 and the memory 420 can be supplemented by, or incorporated in, special purpose logic circuitry.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the clipped point can be determined using parallel processing for each of the planes, polygons, and/or surfaces that make up the bounded space. The implementation can be given from the equation:

$$o = i + (a-i) * \text{Max}\left(0, \text{Max}\left(\frac{n_j \cdot (i - p_j)}{|n_j \cdot (a-i)|}\right) \text{ for all planes } j\right), \quad \text{Eq. 7}$$

where o is the clipped point, a is the aim point, i is the input point, $n_j$ is a vector normal to a plane j of the bounded space, and $p_j$ is a point on the plane j. If the gamut boundary is defined as points, the offset to a given boundary plane can be determined using a variant of the method. Specifically, the following equation can be used to determine particular offsets for each boundary plane:

$$\text{offset}_j = \text{Max}(n \cdot q_k) \text{ for all pts } k \quad \text{Eq. 8,}$$

where $\text{offset}_j$ is the offset for a plane j, $n_j$ is a vector normal to the plane j of the bounded space, and $q_k$ is the $k^{th}$ point on the gamut surface.

What is claimed is:
1. A method comprising:
defining a bounded space approximating a color gamut based on at least a first plane approximately tangential to the color gamut;
identifying an input point, wherein the input point represents a color that is outside the bounded space;
determining, by operation of a computer, a first distance between the first plane and the input point, the first distance being measured in a direction normal to the first plane;
determining, by operation of a computer, a second distance between the input point and an aim point, the second distance being measured in a direction normal to the first plane, wherein the aim point represents a color within the bounded space; and
determining, by operation of a computer, a clipped point based on a ratio between the first distance and the second distance, the clipped point representing an approximation of a color on a boundary of the color gamut.

2. The method of claim 1, wherein the bounded space is defined in a Cartesian coordinate system that has more than two dimensions.

3. The method of claim 1, wherein the color gamut is associated with a device-dependent color space, and the bounded space is defined in a device-independent color space.

4. The method of claim 1, wherein the first plane is defined by a point on the first plane and a normal vector to the first plane and determining the second distance between the input point and the aim point comprises determining a scalar projection of a vector comprising endpoints of the input point and the aim point onto the normal vector defining the first plane.

5. The method of claim 4, wherein the first distance is determined based on a dot product of the normal vector and a vector comprising the input point and an origin point.

6. The method of claim 1, wherein the color gamut is a first color gamut, and the input point is derived from a color value of a device-dependent color space that differs from a color space associated with the first color gamut.

7. The method of claim 1, wherein the bounded space comprises a second plane approximately tangential to the color gamut, the input point is outside the bounded space with respect to the first plane and the second plane, and the method further comprising:
determining a third distance between the second plane and the input point, wherein the third distance comprises a distance in a direction normal to the second plane; and
determining a fourth distance between the input point and an aim point located within the bounded space, wherein the fourth distance comprises a distance in a direction normal to the second plane;
determining a maximum relative distance based on a comparison of a ratio of the first and second distance with a ratio of the third and fourth distance; and
determining a clipped point representing at least an approximation of a color on a boundary of the color gamut based on the maximum relative distance.

8. The method of claim 1, wherein the aim point represents a color within the bounded space and the second distance comprises a combination of the first distance and a distance between the first plane and the aim point in a direction normal to the first plane.

9. The method of claim 1, further comprising:
determining whether the input point is inside or outside the bounded space using the first distance; and
using the clipped point as an output point, when the input point is determined to be outside the bounded space.

10. A computer program product, encoded on a non-transitory computer-readable medium, operable to cause a data processing apparatus to perform operations comprising:
defining a bounded space approximating a color gamut based on at least a first plane approximately tangential to the color gamut;
identifying an input point, wherein the input point represents a color that is outside the bounded space;
determining a first distance between the first plane and the input point, the first distance being measured in a direction normal to the first plane;
determining a second distance between the input point and an aim point, the second distance being measured in a direction normal to the first plane, wherein the aim point represents a color within the bounded space; and
determining a clipped point based on a ratio between the first distance and the second distance, the clipped point representing an approximation of a color on a boundary of the color gamut.

11. The product of claim 10, wherein the bounded space is defined in a Cartesian coordinate system that has more than two dimensions.

12. The product of claim 10, wherein the color gamut is associated with a device-dependent color space, and the bounded space is defined in a device-independent color space.

13. The product of claim 10, wherein the first plane is defined by a point on the first plane and a normal vector to the first plane and determining the second distance between the input point and the aim point comprises determining a scalar projection of a vector comprising endpoints of the input point and the aim point onto the normal vector defining the first plane.

14. The product of claim 13, wherein the first distance is determined based on a dot product of the normal vector and a vector comprising the input point and an origin point.

15. The product of claim 10, wherein the color gamut is a first color gamut, and the input point is derived from a color value of a device-dependent color space that differs from a color space associated with the first color gamut.

16. The product of claim 10, wherein the bounded space comprises a second plane approximately tangential to the color gamut, the input point is outside the bounded space with respect to the first plane and the second plane, and the operations further comprising:
determining a third distance between the second plane and the input point, wherein the third distance comprises a distance in a direction normal to the second plane; and
determining a fourth distance between the input point and an aim point located within the bounded space, wherein the fourth distance comprises a distance in a direction normal to the second plane;
determining a maximum relative distance based on a comparison of a ratio of the first and second distance with a ratio of the third and fourth distance; and
determining a clipped point representing at least an approximation of a color on a boundary of the color gamut based on the maximum relative distance.

17. A system comprising:
a memory operable to store color values; and
a processor coupled to the memory operable to:
define a bounded space approximating a color gamut based on at least a first plane approximately tangential to the color gamut;
identify an input point, wherein the input point represents a color that is outside the bounded space;
determining a first distance between the first plane and the input point, the first distance being measured in a direction normal to the first plane;
determining a second distance between the input point and an aim point, the second distance being measured in a direction normal to the first plane, wherein the aim point represents a color within the bounded space; and
determining a clipped point based on a ratio between the first distance and the second distance, the clipped point representing an approximation of a color on a boundary of the color gamut.

18. The system of claim 17, wherein the bounded space is defined in a Cartesian coordinate system that has more than two dimensions.

19. The system of claim 17, wherein the color gamut is associated with a device-dependent color space, and the bounded space is defined in a device-independent color space.

20. The system of claim 17, wherein the first plane is defined by a point on the first plane and a normal vector to the first plane and the processor further operable to determine a scalar projection of a vector comprising endpoints of the input point and the aim point onto the normal vector defining the first plane.

21. The system of claim 20, wherein the first distance is determined based on a dot product of the normal vector and a vector comprising the input point and an origin point.

22. The system of claim 17, wherein the color gamut is a first color gamut, and the input point is derived from a color value of a device-dependent color space that differs from a color space associated with the first color gamut.

23. The system of claim 17, wherein the bounded space comprises a second plane approximately tangential to the color gamut, the input point is outside the bounded space with respect to the first plane and the second plane, and the processor further operable to:

determine a third distance between the second plane and the input point, wherein the third distance comprises a distance in a direction normal to the second plane; and determine a fourth distance between the input point and an aim point located within the bounded space, wherein the fourth distance comprises a distance in a direction normal to the second plane;

determine a maximum relative distance based on a comparison of a ratio of the first and second distance with a ratio of the third and fourth distance; and determine a clipped point representing at least an approximation of a color on a boundary of the color gamut based on the maximum relative distance.

* * * * *